United States Patent [19]

Michel et al.

[11] E Patent Number: Re. 32,504

[45] Reissued Date of Patent: Sep. 15, 1987

[54] ROOM TEMPERATURE STABLE ORGANOPOLYSILOXANE COMPOSITIONS

[75] Inventors: Ulrich Michel, Burghausen; Josef Radecker, Emmerting, both of Fed. Rep. of Germany

[73] Assignee: Wacker-Chemie GmbH, Munich, Fed. Rep. of Germany

[21] Appl. No.: 868,990

[22] Filed: May 30, 1986

Related U.S. Patent Documents

Reissue of:

[64] Patent No.: 4,530,989
Issued: Jul. 23, 1985
Appl. No.: 590,314
Filed: Mar. 16, 1984

[30] Foreign Application Priority Data

Apr. 26, 1983 [DE] Fed. Rep. of Germany ..... 3315060

[51] Int. Cl.[4] ..... C08G 77/06

[52] U.S. Cl. ..... 528/15; 528/31; 528/32; 524/717; 524/719; 524/753; 524/773; 524/774; 524/862; 524/478

[58] Field of Search ..... 528/15, 31, 32; 524/717, 719, 753, 773, 774, 862, 478

[56] References Cited

U.S. PATENT DOCUMENTS

| | | | |
|---|---|---|---|
| 4,163,081 | 7/1979 | Schulz | 528/15 |
| 4,256,870 | 3/1981 | Eckberg | 528/15 |
| 4,448,815 | 5/1984 | Grenoble et al. | 528/15 |
| 4,504,645 | 3/1985 | Melancon | 528/15 |
| 4,530,989 | 7/1985 | Michel et al. | 528/15 |
| 4,533,575 | 8/1985 | Melancon | 528/15 |

*Primary Examiner*—Melvyn I. Marquis

[57] ABSTRACT

Room temperature stable organopolysiloxane compositions containing organosilicon compounds having Si-bonded hydrogen atoms and aliphatic multiple bonds, a platinum catalyst which promotes the addition of Si-bonded hydrogen atoms to the aliphatic multiple bonds and an inhibitor which prevents premature crosslinking at room temperature selected from the group consisting of a maleinimide and a maleic acid derivative of the formula

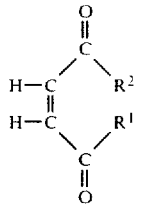

where $R^1$ is a hydroxyl group or a trimethylsiloxy group and $R^2$ is a monovalent hydrocarbonoxy radical having from 1 to 20 carbon atoms per radical, which is bonded to the carbon atom of the

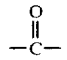

group or a monovalent hydrocarbonoxy radical having from 1 to 20 carbon atoms per radical, which is bonded to the carbon atom of the

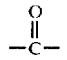

group and which is substituted with at least one triorganosilyl group.

14 Claims, No Drawings

ROOM TEMPERATURE STABLE ORGANOPOLYSILOXANE COMPOSITIONS

Matter enclosed in heavy brackets [ ] appears in the original patent but forms no part of this reissue specification; matter printed in italics indicates the additions made by reissue.

The present invention relates to organopolysiloxane compositions, particularly to room temperature stable organopolysiloxane compositions and more particularly to organopolysiloxane compositions containing derivatives of maleic acid to prevent premature crosslinking at room temperature.

BACKGROUND OF THE INVENTION

Organopolysiloxane compositions containing organopolysiloxanes having Si-bonded hydrogen atoms and vinyl groups which are crosslinked by the addition of Si-bonded hydrogen atoms to vinyl groups with a platinum catalyst and contain an additive which delays crosslinking at room temperature, are described in the literature. Organopolysiloxane compositions containing additives such as maleic acid diesters, to inhibit crosslinking at room temperature are described in U.S. Pat. No. 4,256,870 to Eckberg.

In contrast to the additive described in the patent, the additives of this invention are less volatile and more effective in preventing crosslinking of organopolysiloxane compositions. In addition, the additives of this invention provide faster crosslinking of the organopolysiloxane composition once the inhibiting effect is overcome than additives known heretofore for inhibiting or preventing crosslinking of organopolysiloxane compositions.

It is, therefore, an object of the present invention to provide an organopolysiloxane composition which is stable at room temperature. Another object of the present invention is to prevent premature crosslinking of an organopolysiloxane composition at room temperature. Another object of the present invention is to provide an additive for an organopolysiloxane composition which inhibits crosslinking at room temperature. Still another object of the present invention is to provide an additive which is less volatile and more effective in preventing crosslinking of the organopolysiloxane composition. A further object of the present invention is to provide an additive which inhibits crosslinking of an organopolysiloxane, but once the inhibiting effect ceases, accelerates crosslinking of the organopolysiloxane composition.

SUMMARY OF THE INVENTION

The foregoing objects and others which will become apparent from the following description are accomplished in accordance with this invention, generally speaking, by providing organopolysiloxane compositions containing organosilicon compounds having Si-bonded hydrogen atoms and organosilicon compounds containing aliphatic multiple bonds, a platinum catalyst which promotes the addition of Si-bonded hydrogen on the aliphatic multiple bonds and a compound which inhibits crosslinking at room temperature selected from the group consisting of a maleinimide and a maleic acid derivative of the formula

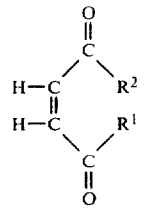

wherein $R^1$ is a hydroxyl group or a trimethylsiloxy group and $R^2$ is a monovalent hydrocarbonoxy radical having from 1 to 20 carbon atoms per radical, which is bonded to the carbon atoms of the

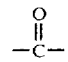

group or a monovalent hydrocarbonoxy radical having from 1 to 20 carbon atoms per radical, which is bonded to the carbon atom of the

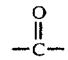

group and which is substituted with at least one triorganosilyl group.

DESCRIPTION OF THE INVENTION

The same linear, cyclic or modified organosilicon compounds containing Si-bonded hydrogen atoms, which have been or could have been used heretofore to prepare crosslinkable organopolysiloxane compositions containing Si-bonded hydrogen atoms may be employed in the compositions of this invention. These organosilicon compounds generally contain organopolysiloxane units of the general formula $$R_mSiO_{\frac{4-m}{2}}.$$

where R represents hydrogen or the same or different monovalent hydrocarbon radicals and substituted monovalent hydrocarbon radicals, where at least 2 and more preferably at least 3 Si-bonded hydrogen atoms are present for each molecule, and m is 0, 1, 2 or 3 and preferably is at least 1, with the added proviso that on the average these units generally contain at least as many organic radicals as Si-bonded hydrogen atoms.

Preferably the Si-bonded hydrogen atoms are present in an amount of from about 0.1 to about 15 Si-bonded hydrogen atoms per aliphatic multiple bond.

It is preferred that the organopolysiloxanes containing Si-bonded hydrogen have a viscosity of from 1 to $10^4$ $mm^2.s^{-1}$ at 25° C., and more preferably from 5 to $5 \cdot 10^3$ $mm^2.s^{-1}$ at 25° C.

The same linear, cyclic or modified organosilicon compounds containing aliphatic multiple bonds which have been or could have been used heretofore in preparing crosslinkable organopolysiloxanes compositions containing Si-bonded hydrogen atoms and aliphatic multiple bonds, e.g., vinyl groups, may be employed in the compositions of this invention.

Such organosilicon compounds are generally organopolysiloxanes having units of the formula $$R_{m'}^{3}.\ SiO_{\frac{4-m'}{2}}.$$

where $R^3$ represents the same or different, monovalent hydrocarbon radicals or substituted monovalent hydrocarbon radicals, where each molecule contains at least two $R^3$ radicals, and preferably no more than 50 percent of the $R^3$ radicals present are vinyl groups, m' is 0, 1, 2 or 3, with an average of from 0.9 to 2.1.

It is preferred that the organopolysiloxanes containing vinyl groups have a viscosity of from 10 to $10^6$ $mm^2.s^{-1}$ at 25° C., and more preferably a viscosity of from 50 to $10^5$ $mm^2.s^{-1}$ at 25° C.

The vinyl groups and the Si-bonded hydrogen atoms may be present in different organosilicon compounds or in the same type of organosilicon compound, i.e., in a variety of molecules or in the same molecule.

It is preferred that the monovalent hydrocarbon radicals represented by R and $R^3$ contain from 1 to 18 carbon atoms per radical. Examples of such hydrocarbon radicals which are free of aliphatic multiple bonds, are alkyl radicals, such as the methyl, ethyl, n-propyl, isopropyl, n-butyl and sec-butyl radical as well as octadecyl radicals, cycloalkyl radicals, such as the cyclohexyl radical and methylcyclohexyl radicals, aryl radicals, such as the phenyl radical; alkaryl radicals, such as the tolyl radicals and aralkyl radicals, such as the benzyl and the beta-phenylethyl radical. Examples of substituted monovalent hydrocarbon radicals represented by R and $R^3$ which are free of aliphatic multiple bonds, are halogenated hydrocarbon radicals, such as the 3,3,3-trifluoropropyl radical and o-, p- and m-chlorophenyl radicals, as well as cyanoalkyl radicals, such as the beta-cyanoethyl radical. Because of their availability, it is, however, preferred that at least 60 percent of the number of R radicals which do not contain Si-bonded hydrogen and at least 60 percent of the R radicals which are free of aliphatic multiple bonds, be methyl radicals.

The same platinum catalysts which have been or could have been used heretofore to promote the addition of Si-bonded hydrogen to vinyl groups may be employed in the compositions of this invention. Examples of such catalysts are metallic and finely dispersed platinum which may be present on carriers such as silicon dioxide, aluminum oxide or active carbon, compounds or complexes of platinum such as platinum halides, for example, $PtCl_4$, $H_2PtCl_6.6H_2O$, $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including the reaction products of $H_2PtCl_6.6H_2O$ and cyclohexanone, platinum-vinylsiloxane complexes, especially platinum-divinyltetramethyldisiloxane complexes with or without a detectable amount of inorganic bonded halogen, bis-(gammapicoline)-platinum dichloride, trimethylenediypridine-platinum dichloride, dicyclopentadiene-platinum dichloride, dimethylsulfoxide-ethyleneplatinum-(II)dichloride, as well as products obtained from the reaction of platinum tetrachloride with olefin and a primary or secondary amine, or primary and secondary amine, such as the reaction product of platinum tetrachloride which has been dissolved in 1-octene, with sec-butylamine.

The platinum catalyst is preferably employed in an amount of from about 0.5 to 500 ppm by weight (parts per million), and more preferably from 2 to 400 ppm by weight, based on the weight of elemental platinum and based on the total weight of the organopolysiloxanes present in the composition.

A preferred maleic acid derivative is represented by the formula

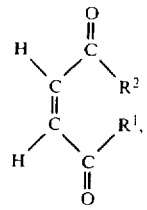

where $R^1$ is the same as above and $R^2$ is a monovalent hydrocarbonoxy radical having from 1 to 20 carbon atoms per radical, which is bonded to the carbon atom of the

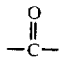

group.

Examples of hydrocarbonoxy radicals represented by $R^2$ are methoxy, ethoxy, n-propoxy, isopropoxy, 2-ethylhexyloxy, allyloxy, cyclohexyloxy, 2-methylbut-3-en-2-oxy, phenoxy and the benzyloxy radical as well as the various butoxy, hexyloxy and hexadecyloxy radicals.

Specific examples of maleic acid derivatives having the formula

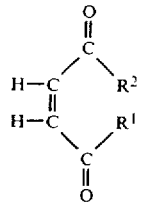

where $R^1$ is a hydroxyl group and $R^2$ is the same as above, are maleic acid semiesters such as maleic acid monomethylester, maleic acid monoethylester, maleic acid mono-n-propylester, maleic acid monoisopropylester, the various maleic acid monobutylesters, the various maleic acid monohexylesters, maleic acid mono-2-ethylhexylester, maleic acid monoallylester, monophenoxy maleate, maleic acid monobenzylester, maleic acid monocyclohexylester, maleic acid mono-2-methylbut-3-en-2-yl-ester, and the various maleic acid monohexadecylesters.

Specific examples of maleic acid derivatives of the formula

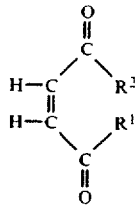

where $R^2$ represents a hydrocarbonoxy radical which is bonded to the carbon atom of the

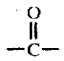

group and $R^1$ is a trimethylsiloxy group, are those of the following formulas

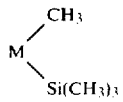

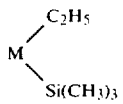

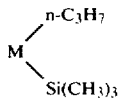

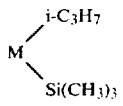

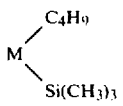

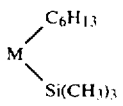

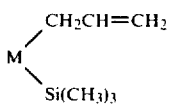

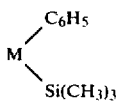

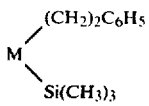

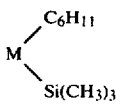

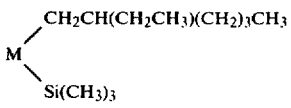

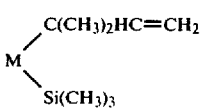

where M represents the group

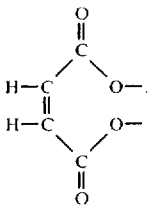

These compounds may be prepared by conventional methods by substituting a trimethylsilyl group for the hydrogen atom in a carboxyl group. For example, a maleic acid semiester, such as maleic acid monomethylester may be reacted with trimethylchlorosilane in the presence of an acid-binding agent such as triethylamine or with another silylating agent, such as bis-trimethylsilyl urea or trimethylsilylimidazole.

However, $R^2$ may also represent a hydrocarbonoxy radical which is bonded to the carbon atom in the

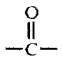

formula in the group

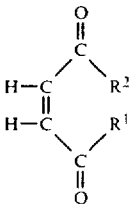

and which is substituted with at least one triorganosilyl group. Preferred among such $R^2$ radicals are those of the following formula $$-O(CR_2^4)_nSiR_3^5,$$

where $R^4$ represents hydrogen or the same or different alkyl radicals having from 1 to 6 carbon atoms per radical, preferably hydrogen, and $R^5$ represents the same or different alkyl radicals having from 1 to 3 carbon atoms per radical and n is an integer with a value of from 3 to 19.

An example of a maleic acid derivative having a triorganosilyl group in the $R^2$ radical which may be used in this invention, is the compound of the formula

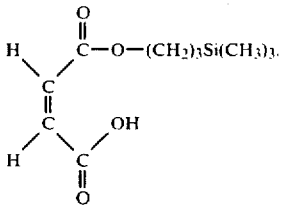

Also, preferred among the maleic acid derivatives are those with the formula $$R^6(SiR_2^7O)_x(SiR^7R^6O)_ySiR_2^7R^6,$$

where at least one of the $R^6$ radicals has the following formula

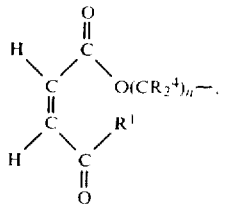

$R^1$, $R^4$ and n are the same as above and the other $R^6$ radicals are those of the formula $$-O(CR_2^4)_nOH$$

or radicals represented by $R^7$ where $R^4$ and n are the same as above. The $R^7$ radicals are alkyl radicals having from 2 to 3 carbon atoms per radical or the phenyl radical, where the alkyl and phenyl radicals may be halogenated, and x represents 0 or an integer having a value of from 1 to 200, preferably no more than 70, and y is an integer having a value of from 1 to 10 and more preferably from 1 to 8.

Specific examples of such organopolysiloxanes which are substituted with at least one group of the formula

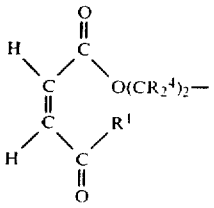

are those corresponding to the following formulas

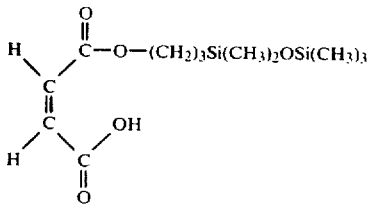

and

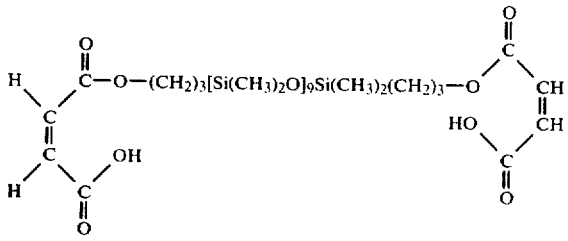

The maleic acid derivatives having a hydrocarbonoxy radical that is bonded to the carbon atom of an

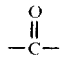

group and which is substituted with a silyl group and organopolysiloxanes of the formula $$R^6(SiR_2^7O)_x(SiR^7R^6O)_ySiR_2^7R^6$$

may for example be prepared by heretofore known methods. These derivatives may be prepared, for example, by the following steps in which (1) compounds of the following formula $$HSiR_3^5,$$

where $R^5$ is the same as above, or compounds of the formula $$R^8Si(R_2^7O)_x(SiR^7R^8O)_ySiR_2^7R^8,$$

where $R^7$, x and y are the same as above and at least one $R^8$ represents hydrogen, while the other radicals have the same meaning as $R^7$, are added to compositions of the formula $$(CH_3)_3SiO(CR_2^4)_{n-2}CH{=}CH_2,$$

in the presence of a platinum catalyst, where $R^4$ and n are the same as above, (2) the carbon-bonded trimethylsiloxy group is cleaved with hydrogen chloride and thereafter (3) the products thus obtained are reacted with maleic acid anhydride to form the acid ester. Preferably, the third step is carried out in the presence of a solvent such as toluene, xylene or halogenated hydrocarbons and at 40° C. or at approximately 40° C. Once the reaction has been completed, the solvent is evaporated.

The maleinimides, which may also be used in the compositions of this invention, are preferably those having the formula

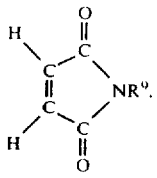

where $R^9$ is hydrogen or a hydroxyl group or a trimethylsiloxy group or a hydrocarbon group. When the hydrocarbon group is an alkyl radical, it may be substituted with a hydroxyl group or with a trimethylsiloxy group.

The preceding examples of hydrocarbon radicals represented by R and $R^3$ are also applicable to the hydrocarbon radicals represented by $R^9$. An additional example of a hydrocarbon radical represented by $R^9$ is the allyl radical.

Specific examples of maleic acid imides which may be used in the compositions of this invention are N-allylmaleinimide, N-2-hydroxyethylmaleinimide, N-vinylmaleinimide, N-2-trimethylsiloxyethylmaleinimide and N-hydroxymethylmaleinimide.

The maleinimides and their methods of preparation are described in the literature. The preparation of the N-hydroxymaleinimide which can also be used in the compositions of this invention is described in the examples.

It is preferred that maleic acid derivatives having the following formula

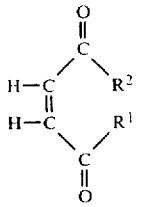

where $R^1$ and $R^2$ are the same as above, or maleinimide be used in the composition of this invention in an amount of from about 0.001 to 1 percent by weight, based on the total weight of the organopolysiloxanes present in the composition.

In addition to the organosilicon compound or compounds having Si-bonded hydrogen and the organosilicon compound or compounds having vinyl groups or organosilicon compounds containing both Si-bonded hydrogen and vinyl groups, the platinum catalyst and the maleic acid derivative, it is possible to employ other substances which have been used or could have been used heretofore in organopolysiloxane compositions that have been crosslinked by the addition of Si-bonded hydrogen atoms to vinyl groups. Examples of such other substances are fillers having a surface area of at least 50 $m^2$/gm, such as pyrogenically produced silicon dioxide or precipitated silicon dioxide having a surface area of at least 50 $m^2$/gm, fillers with a surface area of at least 50 $m^2$/gm, such as quartz meal, glass fibers, diatomaceous earth, electrically conductive materials, such as acetylene soot, pigments, soluble dyes, emollients, pure organic resins such as polyvinyl chloride powder, agents for improving the adhesion of the elastomeric or non-elastomeric products on the substrates on which they were formed and additives other than the maleic acid derivatives of this invention, which have been used to delay crosslinking of organopolysiloxane compositions.

If desired, the above fillers may be rendered hydrophobic, for example, by treating them with hexamethyldisilazane.

The compositions of this invention are preferably crosslinked at temperatures of from about 20° to 180° C., and more preferably at temperatures of from about 60° to about 170° C.

The compositions of this invention can be used for all purposes for which crosslinked organopolysiloxanes may be desirable. They may, for example, be used for embedding electrical or electronic components, for sealing purposes, for joining pieces of glass or plates made of transparent plastic material, for insulating electrical conduits, for manufacturing molded objects, including cable caps, for manufacturing adhesive-repellent coatings, for example, on paper, and generally for the coating of substrates of all types, including fabrics made of organic or inorganic fibers.

In the following examples, all parts are by weight unless otherwise specified.

PREPARATION OF PLATINUM-VINYLSILOXANE COMPLEX

A mixture consisting of a platinum-vinylsiloxane complex and diluent which is used in the following examples and in the comparison example was prepared in the following manner:

To a mixture consisting of 10 parts of $H_2PtCl_6.6H_2O$, 20 parts of 1,3-divinyl-1,1,3,3-tetramethyldisiloxane and 50 parts ethanol was added 20 parts of sodium bicarbonate. The mixture was heated to boiling under reflux for 30 minutes, then allowed to stand for 15 hours and finally filtered. At a pressure of approximately 16 mbar (abs.), the volatile components were distilled from the filtrate. The residue consisted of 17 parts of a liquid which was dissolved in benzene. The solution was filtered and the benzene was distilled from the filtrate. The residue was then dissolved in a dimethylpolysiloxane having vinyldimethylsiloxy groups as terminal units and having a viscosity of 1,000 $mm^2.s^{-1}$ at 25° C., in an amount such that the solution contained 1 percent by weight of platinum, based on the element.

[EXAMPLE 1

A mixture containing 100 parts of a dimethylpolysiloxane having vinyldimethylsiloxy terminal groups and a viscosity of 0.5 Pa.s at 25° C., 40 ppm by weight based on the total weight of the composition of platinum as the platinum-vinylsiloxane complex and diluent prepared above, and $33.882 \cdot 10^{-3}$ parts maleic acid monoethylester was allowed to stand for 24 hours at 23.5° C.; and then 100 parts of the mixture were mixed with 3 parts of a trimethylsiloxy endblocked copolymer which consisted of 33.33 mole percent dimethylsiloxane and 66.66 mole percent methylhydrogensiloxane units having a viscosity of 0.06 Pa.s at 25° C.

The resultant organopolysiloxane composition was kept in an open container at 23.5° C. until it had a viscosity of 2 Pa.s. The elapsed time was 5.75 hours.

EXAMPLE 2

The procedure described in Example 1 was repeated, except that $36.704 \cdot 10^{-3}$ parts of maleic acid monoallylester were substituted for the $33.882 \cdot 10^{-3}$ parts of maleic acid monoethylester. The mixture attained a viscosity of 2 Pa.s at 23.5° C. after 10 hours.

EXAMPLE 3

The procedure described in Example 1 was repeated, except that $53.646 \cdot 10^{-3}$ parts of maleic acid mono-2-ethylhexylester were substituted for the $33.882 \cdot 10^{-3}$ parts of maleic acid monoethylester. The mixture attained a viscosity of 2 Pa.s at 23.5° C. after 4.8 hours.

COMPARISON EXAMPLE

The procedure described in Example 1 was repeated, except that $46.116 \cdot 10^{-3}$ parts of maleic acid diallylester were substituted for the $33.882 \cdot 10^{-3}$ parts of maleic acid monoethylester. A viscosity of 2 Pa.s at 23.5° C. was attained after 2.9 hours.]

EXAMPLE 4

[The procedure described in Example 1 was repeated, except that] *A mixture containing 100 parts of a dimethylpolysiloxane having vinyldimethylsiloxy terminal groups and a viscosity of 0.5 Pa.s at 25° C., 40 ppm by weight based on the total weight of the composition of platinum as the platinumvinylsiloxane complex and diluent prepared above and* $71.528 \cdot 10^{-3}$ parts of an organosiloxane having the formula

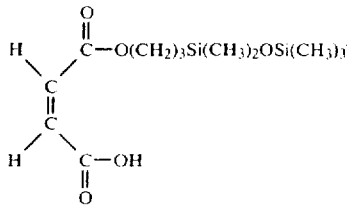

[were substituted for the $33.882 \cdot 10^{-3}$ parts of] maleic acid monoethylester *was allowed to stand for 24 hours at 23.5° C.; and then 100 parts of the mixture were mixed with 3 parts of a trimethylsiloxy endblocked copolymer which consisted of 33.33 mole percent dimethylsiloxane and 66.66 mole percent methylhydrogensiloxane units having a viscosity of 0.06 Pa.s at 25° C.*

*The resultant organopolysiloxane composition was kept in an open container at 23.5° C. until it had a viscosity of 2 Pa.s.*

The time elapsed before the mixture attained the desired viscosity at 23.5° C. was 14 hours.

At a temperature of 150° C., [Examples 1 through] *Example* 4 crosslinked and formed [elastomers] *an elastomer* within 10 seconds.

The maleic acid derivative employed above was prepared in the following manner:

(a) A solution containing 130 gm of allyloxytrimethylsilane and 340 ml of toluene was mixed with 0.2 ml of a 0.1 percent by weight solution of dicyclopentadiene-platinum dichloride in methylene chloride and then heated to boiling. While boiling was maintained, about 148 gm of pentamethyldisiloxane in 150 ml of toluene were added dropwise to the boiling mixture over a period of 90 minutes. The mixture was boiled under reflux for an additional 3 hours and after the mixture had cooled to room temperature, active charcoal was added in order to absorb the platinum catalyst. Following filtration and removal of the solvent in a rotating evaporator, the product consisted of 190 gm of a composition having the formula $$(CH_3)_3SiO(CH_2)_3Si(CH_3)_2OSi(CH_3)_3.$$

(b) A solution consisting of 190 gm of the composition obtained in (a) above and 350 ml of methanol was mixed with 3 ml of concentrated hydrochloric acid and stirred for 1 hour at room temperature. The resultant mixture was then mixed with 1.6 gm sodium carbonate and stirred for one additional hour. After the methanol had been distilled off and following the filtration of the precipitated salt, the product consisted of 120 gm of a compound of the formula $$HO(CH_2)_3Si(CH_3)_2OSi(CH_3)_3.$$

(c) About 94 gm of composition (b) above, and 45 gm of maleic acid anhydride were stirred for 72 hours at 40° C. in 500 ml of toluene. After the toluene had been distilled off, 135 gm of a light yellow liquid were obtained, which corresponded to the maleic acid derivative described in Example (4) above, as determined by $^1$H-NMR spectroscopy.

EXAMPLE 5

About 100 parts of a dimethylpolysiloxane containing vinyldimethylsiloxy terminal units and having a viscosity of 10 Pa.s at 25° C., were mixed with 20 parts of pyrogenically produced hydrophobic silicon dioxide having a surface area of 150 $m^2$/gm and trimethylsilyloxy groups, 2 parts of a trimethylsiloxy endblocked copolymer which consisted of 50 mole percent of dimethylsiloxane units and 50 mole percent of methylhydrogensiloxane units, and which had a viscosity of 0.1 Pa.s at 25° C., 5 ppm by weight based on the weight of the total composition of platinum in the form of $H_2PtCl_6.6H_2O$ and 0.06 parts of N-2-hydroxyethylmaleinimide.

Even after storing for 6 days at room temperature, the viscosity of the organopolysiloxane composition did not change. When the composition was exposed to a temperature of 165° C., the composition crosslinked within 5 minutes, forming an elastomer having a Shore-A hardness of 40.

EXAMPLE 6

About 100 parts of a vinyldimethylsiloxy endblocked copolymer consisting of 99.8 mole percent of dimethylsiloxane units and 0.2 mole percent of vinylmethylsiloxane units and having a viscosity of $10^4$ Pa.s at 25° C., were mixed with 8 parts of a dimethylpolysiloxane having an Si-bonded hydroxyl group in each of its terminal units and having a viscosity of 30 mPa.s at 25° C., 10 parts of pyrogenically produced silicon dioxide having a surface area of 200 $m^2$/gm, 30 parts of acetylene black, 2.5 parts of a trimethylsiloxy endblocked copolymer consisting of 50 mole percent of dimethylsiloxane units and 50 mole percent of methylhydrogensiloxane units and a viscosity of 0.1 Pa.s at 25° C., 10 ppm by weight, based on the total weight of the composition of platinum in the form of $H_2PtCl_6.6H_2O$ and 0.07 parts of N-2-hydroxyethylmaleinimide.

After five days, the organopolysiloxane composition was still in a plastic state. When exposed to a temperature of 150° C., the composition crosslinked within 5 minutes, forming an elastomer having a Shore-A hardness of 70.

EXAMPLE 7

The procedure described in Example 6 was repeated except that 35 parts of pyrogenic silicon dioxide having a surface area of 200 $m^2$/g and 5 ppm by weight of platinum in the form of $H_2PtCl_6.6H_2O$ were substituted for the 10 parts of pyrogenic silicon dioxide having a surface area of 200 $m^2$/gm and the 10 ppm by weight of platinum in the form of $H_2PtCl_6.6H_2O$. No acetylene black was employed in this composition.

After five days the organopolysiloxane composition was still in a plastic state. When exposed to a temperature of 150° C., it crosslinked within 5 minutes, to form an elastomer having a Shore-A hardness of 50.

EXAMPLE 8

The procedure of Example 5 was repeated, except that the same molar quantity of N-trimethylsilyloxymaleinimide was substituted for the 0.06 parts of N-2-hydroxyethylmaleinimide. The product was substantially the same as that of Example 5.

The N-trimethylsilyloxymaleinimide used in this example was prepared in the following manner:

(a) About 18.1 gm of a compound having the formula

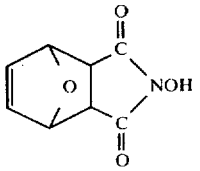

(Bull. Soc. Chem. Jap., 44, 1971, pages 1084–1089, Mitsuaki Narita et al.) and 12.3 gm of bis-trimethylsilyl urea in 200 ml of methylene chloride were stirred for 12 hours at room temperature and then filtered. The solvent was then removed in a rotating evaporator. The product consisted of 25 gm of the compound having the above formula, except that the hydrogen which was bonded to nitrogen via oxygen was substituted with a trimethylsilyl group. This structure was determined by $^1$H-NMR spectroscopy.

(b) About 20 gm of the compound obtained from (a) above were slowly heated to 160° C. in a distillation apparatus, resulting in the sudden development of furan. Once the production of furan had terminated, the residue was distilled at 130 Pa (abs.). At 100° C. a light yellow liquid distilled over and crystallized immediately (melting point 117° C.). According to $^1$H-NMR spectroscopy, the liquid was N-trimethylsilyloxymaleinimide.

EXAMPLE 9

The procedure of Example 6 was repeated, except that the same molar quantity of N-hydroxymaleinimide was substituted for the 0.07 parts of N-2-hydroxyethylmaleinimide. The results were substantially identical to those of Example 6.

The hydroxymaleinimide used above was prepared in the following manner:

About 3 gm of the compound obtained in Example 8(b) were added to 10 ml of water and stirred for 15 minutes at room temperature. After the water had been evaporated in a rotating evaporator, 1.8 gm of N-hydroxymaleinimide having a melting point of 141° C. were obtained.

What is claimed is:

1. A crosslinkable organopolysiloxane composition comprising an organosilicon compound having Si-bonded hydrogen atoms, in organosilicon compound having aliphatic multiple bonds, a platinum catalyst capable of promoting the addition of the Si-bonded hydrogen atoms to the aliphatic multiple bonds and an inhibitor which delays or prevents crosslinking at room temperature which is selected from the group consisting of maleinimide and a maleic acid derivative selected from the group consisting of

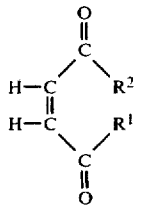

and $R^6(SiR_2^7O)_x(SiR^7R^6O)_ySiR_2^7R_6$, where $R^1$ is [selected from the group consisting of a hydroxyl group and] a trimethylsiloxy group, $R^2$ is a radical selected from the group consisting of a hydrocarbonoxy radical which is bonded to the carbon atom of the

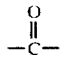

group and a hydrocarbonoxy radical which is bonded to the carbon atom of the

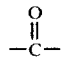

group and is substituted with at least one triorganosilyl group, at least one $R^6$ is a radical of the formula

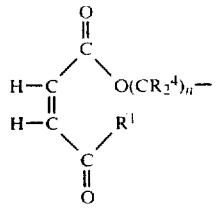

and the other $R^6$ radicals are selected from the group consisting of the formula $$-O(CR_2^4)_nOH$$

and $R^7$, where $R^1$ is the same as above, $R^4$ is selected from the group consisting of hydrogen and an alkyl radical having from 1 to 6 carbon atoms per radical, $R^7$ is selected from the group consisting of phenyl and alkyl radicals having 2 or 3 carbon atoms per radical and halogenated phenyl and alkyl radicals having 2 or 3 carbon atoms per radical, n is an integer having a value of from 3 to 19, x is 0 or an integer having a value of from 1 to 200 and y is an integer having a value of from 1 to 10.

2. The composition of claim 1, wherein the maleic acid derivative has the formula

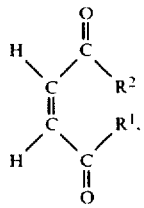

where $R^1$ is [selected from the group consisting of a hydroxyl group and] a trimethylsiloxy group and $R^2$ is a hydrocarbonoxy radical which is bonded to the carbon atom of the

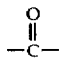

group.

3. The composition of claim 1, wherein $R^1$ is [selected from the group consisting of a hydroxyl group and] a trimethylsiloxy group and $R^2$ represents a hydrocarbonoxy radical which is substituted with a triorganosilyl group.

4. The composition of claim 1, wherein $R^2$ is a radical of the formula, $$-O(CR_2^4)_nSiR_3^5,$$

where $R^4$ is selected from the group consisting of hydrogen and an alkyl radical having from 1 to 3 carbon atoms per radical, $R^5$ is an alkyl radical having from 1 to 3 carbon atoms per radical, and n is an integer having a value of from 3 to 19.

5. The composition of claim 1, wherein the maleic acid derivative has the formula $$R^6(SiR_2^7O)_x(SiR^7R^6O)_ySiR^7R^6$$

and at least one of the $R^6$ radicals has the formula

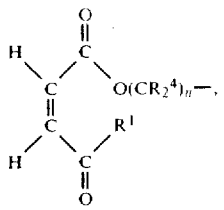

where $R^1$ is [selected from the group consisting of a hydroxyl group and] a trimethylsiloxy group, and the other $R^6$ radicals are selected from the group consisting of a radical of the formula $$-O(CR_2^4)_nOH$$

and $R^7$, where $R^7$ is selected from the group consisting of phenyl and alkyl radicals having 2 or 3 carbon atoms per radical and halogenated phenyl and alkyl radicals having 2 or 3 carbon atoms per radical, $R^4$ is selected from the group consisting of hydrogen and an alkyl radical having from 1 to 6 carbon atoms per radical, n is an integer having a value of from 3 to 19, x represents 0 or an integer having a value of from 1 to 200 and y is an integer having a value of from 1 to 10.

6. The composition of claim 1, wherein the maleic acid derivative is present in an amount of from 0.001 to 1 percent by weight, based on the total weight of the organosilicon compounds.

7. A method for inhibiting premature crosslinking of organopolysiloxane compositions at room temperature, which comprises mixing an organosilicon compound having Si-bonded hydrogen atoms with an organosilicon compound containing aliphatic multiple bonds, a platinum catalyst capable of promoting the addition of the Si-bonded hydrogen to the aliphatic multiple bonds and an inhibitor selected from the group consisting of maleinimide and a maleic acid derivative selected from the group consisting of

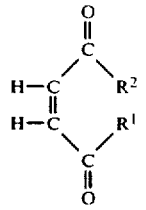

and $R^6(SiR_2^7O)_x(SiR^7R^6O)_ySiR_2^7R^6$, where $R^1$ is [selected from the group consisting of a hydroxyl group and] a trimethylsiloxy group, $R^2$ is a radical selected from the group consisting of a hydrocarbonoxy radical which is bonded to the carbon atom of the

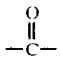

group and a hydrocarbonoxy radical which is bonded to the carbon atom of the

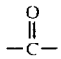

group and is substituted with at least one triorganosilyl group, at least one $R^6$ is a radical of the formula

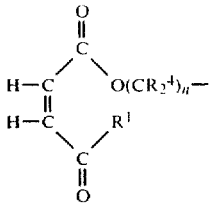

and the other $R^6$ radicals are selected from the group consisting of a radical of the formula $$-O(CR_2^4)_nOH$$

and $R^7$, where $R^1$ is the same as above, $R^4$ is selected from the group consisting of hydrogen and an alkyl radical having from 1 to 6 carbon atoms per radical, $R_7$ is selected from the group consisting of phenyl and alkyl radicals having 2 or 3 carbon atoms per radical and halogenated phenyl and alkyl radicals having 2 or 3 carbon atoms per radical, n is an integer having a value of from 3 to 19, x is 0 or an integer having a value of from 1 to 200 and y is an integer having a value of from 1 to 10.

8. The method of claim 7, wherein the composition is crosslinked by heating to a temperature of from 60° to 180° C.

*9. A crosslinkable organopolysiloxane composition comprising an organosilicon compound having Si-bonded hydrogen atoms, an organosilicon compound having aliphatic multiple bonds, a platinum catalyst capable of promoting the addition of the Si-bonded hydrogen atoms to the aliphatic multiple bonds and an inhibitor which delays or prevents crosslinking at room temperature, which is selected from the group consisting of maleinimide and a maleic acid derivative selected from the group consisting of*

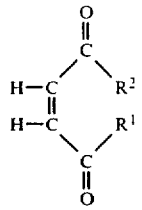

*and $R^6(SiR_2^7O)_x(SiR^7R^6O)_ySiR_2^7R_6$, where $R^1$ is a hydroxyl group, $R^2$ is a hydrocarbonoxy radical which is bonded to the carbon atom of the*

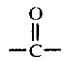

group and is substituted with at least one triorganosilyl group, at least one $R^6$ is a radical of the formula

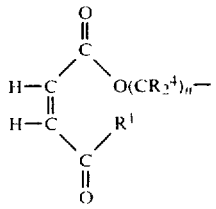

and the other $R^6$ radicals are selected from the group consisting of the formula $$-O(CR_2^4)_nOH$$

and $R^7$, where $R^1$ is the same as above, $R^4$ is selected from the group consisting of hydrogen and an alkyl radical having from 1 to 6 carbon atoms per radical, $R^7$ is selected from the group consisting of phenyl and alkyl radicals having 2 or 3 carbon atoms per radical and halogenated phenyl and alkyl radicals having 2 or 3 carbon atoms per radical, n is an integer having a value of from 3 to 19, x represents 0 or an integer having a value of from 1 to 200 and y is an integer having a value of from 1 to 10.

10. The composition of claim 9, wherein $R^2$ is a radical of the formula $$-O(CR_2^4)_nSiR_3^5.$$

where $R^4$ is selected from the group consisting of hydrogen and an alkyl radical having from 1 to 6 carbon atoms per radical, $R^5$ is an alkyl radical having from 1 to 3 carbon atoms per radical, and n is an integer having a value of from 3 to 19.

11. The composition of claim 9, wherein the maleic acid derivative has the formula $$R^6(SiR_2^7O)_x(SiR^7R^6O)_ySiR^7R^6$$

and at least one of the $R^6$ radicals has the formula

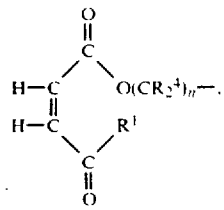

where $R^1$ is a hydroxyl group and the other $R^6$ radicals are selected from the group consisting of a radical of the formula $$-O(CR_2^4)_nOH$$

and $R^7$, where $R^7$ is selected from the group consisting of phenyl and alkyl radicals having 2 or 3 carbon atoms per radical and halogenated phenyl and alkyl radicals having 2 or 3 carbon atoms per radical, $R^4$ is selected from the group consisting of hydrogen and an alkyl radical having from 1 to 6 carbon atoms per radical, n is an integer having a value of from 3 to 19, x represents 0 or an integer having a value of from 1 to 200 and y is an integer having a value of from 1 to 10.

12. The composition of claim 9, wherein the maleic acid derivative is present in an amount of from 0.001 to 1 percent by weight, based on the total weight of the organosilicon compounds.

13. A method for inhibiting premature crosslinking of organopolysiloxane compositions at room temperature, which comprises mixing an organosilicon compound having Si-bonded hydrogen atoms with an organosilicon compound containing aliphatic multiple bonds, a platinum catalyst capable of promoting the addition of the Si-bonded hydrogen to the aliphatic multiple bonds and an inhibitor selected from the group consisting of maleinimide and a maleic acid derivative selected from the group consisting of

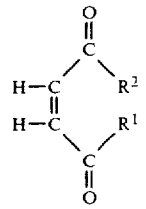

and $R^6(SiR_2^7O)_x(SiR^7R^6O)_ySiR_2^7R^6$, where $R^1$ is a hydroxyl group, $R^2$ is a hydrocarbonoxy radical which is bonded to the carbon atom of the

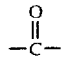

group and is substituted with at least one triorganosilyl group, at least one $R^6$ is a radical of the formula

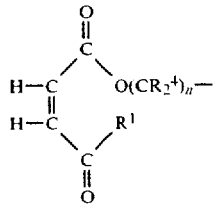

and the other $R^6$ radicals are selected from the group consisting of a radical of the formula $$-O(CR_2^4)_nOH$$

and $R^7$, where $R^1$ is the same as above, $R^4$ is selected from the group consisting of hydrogen and an alkyl radical having from 1 to 6 carbon atoms per radical, $R_7$ is selected from the group consisting of phenyl and alkyl radicals having 2 or 3 carbon atoms per radical and halogenated phenyl and alkyl radicals having 2 or 3 carbon atoms per radical, n is an integer having a value of from 3 to 19, x represents 0 or an integer having a value of from 1 to 200 and y is an integer having a value of from 1 to 10.

14. The method of claim 13, wherein the composition is crosslinked by heating to a temperature of from 60° to 180° C.

* * * * *